United States Patent
Overmann, Jr.

(10) Patent No.: US 9,156,102 B2
(45) Date of Patent: Oct. 13, 2015

(54) PRESSURE WELDING USING PROPYLENE

(71) Applicant: Goodrich Corporation, Charlotte, NC (US)

(72) Inventor: Mark Overmann, Jr., Lorain, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 137 days.

(21) Appl. No.: 13/956,097

(22) Filed: Jul. 31, 2013

(65) Prior Publication Data

US 2015/0034705 A1 Feb. 5, 2015

(51) Int. Cl.
| | |
|---|---|
| *B23K 20/00* | (2006.01) |
| *B23K 5/00* | (2006.01) |
| *B23K 20/02* | (2006.01) |
| *B23K 11/02* | (2006.01) |
| *B23K 35/38* | (2006.01) |
| *B64F 5/00* | (2006.01) |

(52) U.S. Cl.
CPC . *B23K 5/00* (2013.01); *B23K 5/006* (2013.01); *B23K 11/02* (2013.01); *B23K 20/02* (2013.01); *B23K 35/38* (2013.01); *B64F 5/0009* (2013.01)

(58) Field of Classification Search
None
See application file for complete search history.

(56) References Cited

U.S. PATENT DOCUMENTS

| | | | | |
|---|---|---|---|---|
| 2,499,577 | A * | 3/1950 | Fine et al. | 216/84 |
| 2,944,449 | A * | 7/1960 | Wheeler et al. | 228/6.1 |
| 2,951,750 | A * | 9/1960 | White | 48/197 FM |
| 3,796,554 | A * | 3/1974 | Meinass | 48/197 FM |
| 3,900,297 | A * | 8/1975 | Michaels | 44/389 |
| 3,989,479 | A * | 11/1976 | White | 48/197 FM |
| 5,222,654 | A | 6/1993 | Oki et al. | |
| 2005/0048217 | A1* | 3/2005 | Taylor et al. | 427/446 |
| 2010/0115829 | A1* | 5/2010 | Rao et al. | 44/361 |
| 2012/0255988 | A1* | 10/2012 | Perry | 228/102 |
| 2013/0228613 | A1* | 9/2013 | Andrecheck et al. | 228/102 |

FOREIGN PATENT DOCUMENTS

GB    1301567    * 12/1972

OTHER PUBLICATIONS

Craft, "B-36 Experimental Uniwelds", Report No. R-209, Feb. 19, 1948, Menasco Manufacturing Company, pp. 1-60.
Kinzel, "Adams Lecture—Solid Phase Welding", The Welding Journal, Dec. 1944, pp. 1124-1143, American Society for Metals.
Fine, et al., "Pressure Welding—Metallurgical Aspects of High Quality Pressure Welded Joints for Landing Gear—Part 1—Influence of Oxygen", Feb. 1946, pp. 350-355.

* cited by examiner

*Primary Examiner* — Kiley Stoner
(74) *Attorney, Agent, or Firm* — Snell & Wilmer LLP

(57) ABSTRACT

A process and method for welding using an oxygen and propylene gas mixture is disclosed herein. Landing gear components may be welded together using this oxygen and propylene gas fuel source. For instance, an axle beam and/or a post of an aircraft may be welded using oxygen and propylene gas fuel source.

20 Claims, 4 Drawing Sheets

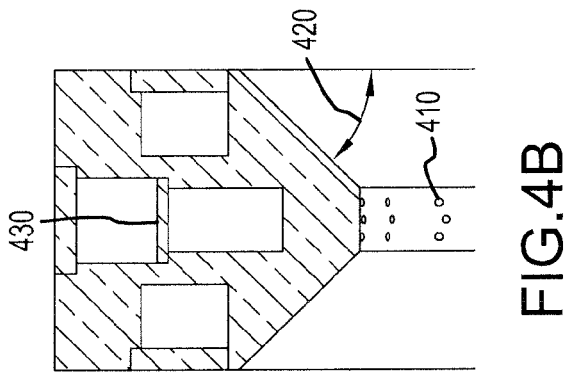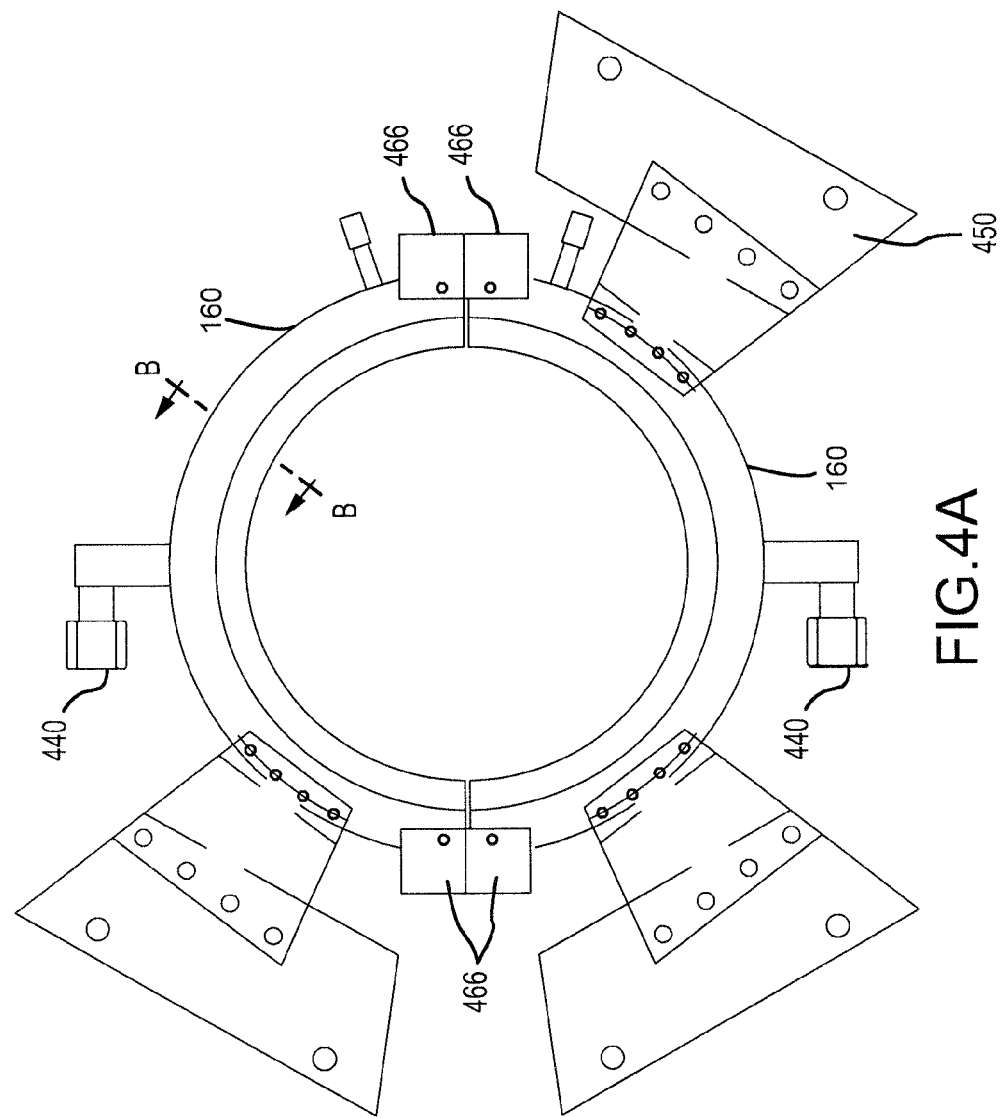

PRESSURE WELDING USING PROPYLENE

FIELD

The present disclosure relates to welding and, more specifically, to pressure welding using propylene as a fuel source.

BACKGROUND

A weld occurs when pieces of metal are joined by causing the interface to bond via diffusion or solidification as a uniform metal joint. This process may be caused by heat, pressure or a combination of both. When heat alone is used, the process is called fusion welding. Pressure welding usually involves heating the surfaces to a plastic state and then forcing the metal together.

SUMMARY

Processes and methods for welding using an oxygen and propylene gas mixture are disclosed herein. In various embodiments, landing gear components may be welded together using this oxygen and propylene gas fuel source. For instance, an axle beam and/or a post of an aircraft landing gear may be welded using an oxygen gas and propylene gas fuel source.

The ratio of oxygen gas to propylene gas in the oxygen gas and propylene gas mixture may be between about 2.4 and 2.5, and more particularly, a value between about 2.43 and 2.47. The term "about" in this specific context may mean +/−0.02. For instance, the ratio of oxygen gas to propylene gas in the oxygen gas and propylene gas mixture may be 2.46. As is described herein, other ratios of oxygen gas to propylene gas are also contemplated. The total gas flow may be about 705 cubic feet per hour ("ft$^3$ hr" or "CFH"). For instance, the flow of oxygen may be about 499 CFH and the flow of propylene gas may be about 206 CFH.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 4A-4B illustrate a burner ring in accordance with various embodiments.

DETAILED DESCRIPTION

Figure 1:
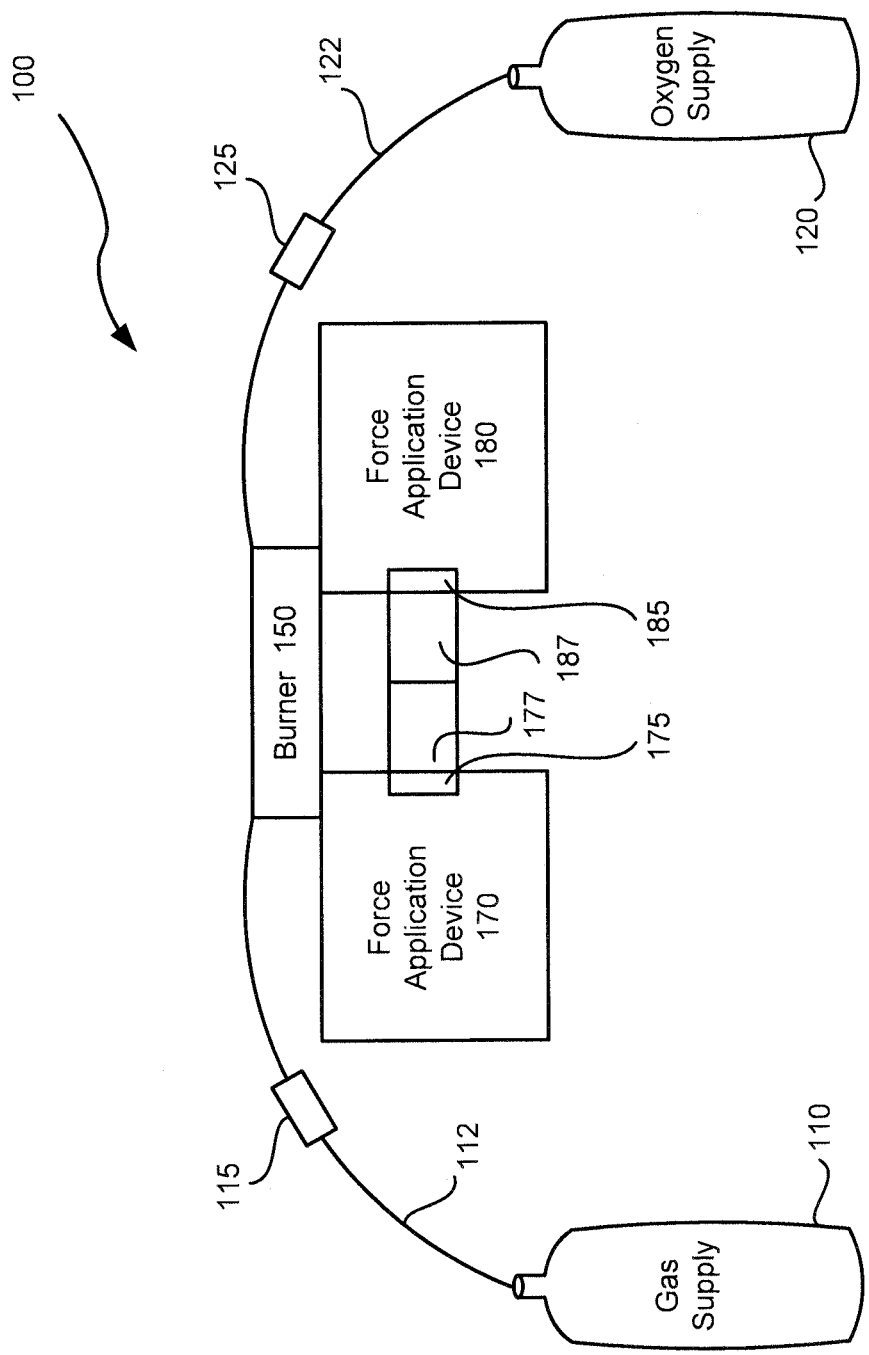
FIG. 1 illustrates block diagram of elements of a pressure welding system in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably. The term welding may include the joining of metals by the application of heat and/or pressure, with or without the addition of a similar metal, such as a filler metal. A welding technique may be designated according to the purpose for which it is used, or the procedure employed, or the nature of the heat source. Some examples include gas welding, electrical-resistance welding, arc welding, and welding based on chemical reactions. As to the nature of the welding process itself, a distinction may be made between pressure welding and fusion welding. Additionally, gas pressure welding may be a distinct class of welding.

A weld occurs when pieces of metal are joined by causing the interface to bond via diffusion or solidification as a uniform metal joint. This process may be caused by heat, pressure or a combination of both. When heat alone is used the process is called fusion welding. Pressure welding usually involves heating the surfaces of a pair of parts to a plastic state and then forcing the parts together. In pressure welding, the parts to be joined are first put under pressure and then locally heated at the place where the joint is to be formed. In response to being in a plastic state at the joint location, the parts are then deformed under force, so they may be united. Filler metal may be employed, but the use of a filler metal is not common.

In gas pressure welding, the parts to be joined are mated by the exertion of substantially continuous pressure or impact type pressure and are then heated by a gas-and-oxygen mixture fuel source to and ignited to a flame. The gas in a gas-and-oxygen mixture may include a flammable gas such as a hydrocarbon gas. The flammable gas acts as a fuel source that burns in the presence of oxygen. For example, acetylene may be used in the gas-and-oxygen mixture as the fuel source.

Acetylene ($C_2H_2$) is a colorless, highly flammable gas. Acetylene (systematic name: ethyne) is the simplest alkyne hydrocarbon, consisting of two hydrogen atoms and two carbon atoms connected by a triple bond. Combustion of acetylene with oxygen may produce a flame of over 3300° C. (5972° F.). Acetylene has long been used as a fuel source for welding applications; however, at times, acetylene may be unstable for high pressure welding applications. For example, the use of acetylene may lead to a backfire. A backfire is the loud popping noise that occurs when a welding or cutting torch flame burns back into the torch tip and is extinguished. Backfires may be caused by improper gas pressures, the torch tip touching the work to molten metal, an incorrectly installed tip, a loose tip, overheated tip, and/or the presence of impurities or other contamination of elements of the welding system.

Propylene may be used as an alternative to welding with acetylene. However, it has been a long held understanding in the welding community that, while cutting may be performed using propylene, it is undesirable for use in welding. In welding, acetylene provides shielding due to the secondary reaction in the acetylene flame consuming oxygen in the atmosphere surrounding the weld. Propylene does not provide this shielding effect. The result has generally been a poor quality weld, such as one with porosity. Porosity is weld metal contamination in the form of a trapped gas. Shielding gases or gases released as a result of the torch being applied to treated metal are absorbed into the molten metal and released as solidification takes place. In other instances, the shielding gas does not completely reach the weld pool and the atmospheric air adversely affects the weld bead.

Controlling the pressure of the gases and the conditions of the burner ring may reduce instances of porosity in the weld. A gas pressure welding system as disclosed herein overcomes these historical concerns and utilizes propylene as the fuel source in its gas-and-oxygen mixture. Stated another way, the gas flows described herein and/or the ratio of gas to oxygen described herein and/or the combination of the two overcome the historical concerns of utilizing propylene as the fuel source in its gas-and-oxygen mixture.

Propylene ($C_3H_6$) (IUPAC name: propene) gas is a colorless, flammable gas characterized by a faintly sweet odor. Propylene is generally commercially available as a liquefied gas. Propylene gas in the gas-and-oxygen mixture has high heat release in its primary and secondary flames. The heat release in the primary flame cone is similar to acetylene. The British thermal unit ("BTU") capacity of the outer flame fueled by propylene is superior to that of acetylene. Propylene gas in the gas-and-oxygen mixture combines the qualities of an acetylene flame with the secondary heating capacity of propane. Propylene burns hotter than propane. Propylene costs less and is much more stable than acetylene.

According to various embodiments, with reference to FIG. 1, a welding system 100 may comprise a gas supply, such as a propylene gas supply 110, and an oxygen supply 120. These gas supplies (propylene gas supply 110 and oxygen supply 120) may be coupled to a burner 150 via gas supply lines 112 and 122. Gas supply lines may be made from any desired material. Burner 150 may mix the propylene gas and the oxygen gas into a gas-and-oxygen fuel source. Burner 150 may be a hand held burner and/or a semi-fixed position burner. Burner 150 may be moved by a worker and/or the movements of burner 150 may be mechanized and controlled by a control system (not shown). Burner 150 may comprise a burner ring 160 as further described below (see FIGS. 4A-4B). Welding system 100 may further comprise a first force application device 170 and a second force application device 180 to direct force on materials being welded together.

First force application device 170 and second force application device 180 may take on any desired shape or structure. First force application device 170 and second force application device 180 may be suitably robust to handle to high heat of the gas pressure welding process. For instance, though not directly in the path of the flame, the materials of first force application device 170 and second force application device 180 will generally resist deformation due to heat of the gas pressure welding process. First force application device 170 and second force application device 180 generally hold a first part 177 and a second part 187 respectively, in place during the gas pressure welding process. First force application device 170 may comprise a retaining member 175 for retaining first part 177 in first force application device 170. Similarly, second force application device 180 may comprise a retaining member 185 for retaining a second part 187 in second force application device 180.

Too much oxygen or too much propylene in the gas-and-oxygen mixture will typically affect the quality of the flame. For instance, an oxidizing flame may result if too much oxygen is used in the gas-and-oxygen mixture, while a reducing flame may result if excess gas is incorporated into the gas-and-oxygen mixture. A neutral flame is the result of a proper gas-and-oxygen mixture Optimal settings are found to provide enhanced performance of welding system 100. According to various embodiments, welding system 100 may be operated using a ratio of oxygen to propylene gas of between 1.5 and 3, and more particularly, about 1.6, about 2.5, and about 2.7. For instance, a ratio of oxygen gas to propylene gas in the propylene-and-oxygen gas mixture is between about 2.4 and 2.5, and more specifically the ratio of oxygen gas to propylene gas in the propylene-and-oxygen gas mixture is between about 2.43 and 2.46 (e.g. the ratio of oxygen to propylene gas may be about 2.4343). According to various embodiments, the ratio of oxygen to propylene gas may be about 2.46. The total flow rate of oxygen-and-propylene mixture may be between 650 and 850 standard cubic feet per hour (SCFH), such as about 675 SCFH, about 700 SCFH, and about 710 SCFH. For instance, the total flow rate of oxygen-and-propylene mixture may be about 704.8 standard cubic feet per hour. The total flow rate of oxygen-and-propylene mixture may be about 705 standard cubic feet per hour. Valves of welding system 100 may assist in controlling the total flow rate. For instance, valves 115 and 125 along supply lines 112 and 122 respectively may control the total flow rate. According to various embodiments, a valve coupled to burner 150 may control the total flow rate and/or a flow ratio. The total weld time may be between 300 and 630 seconds, such as about 313 seconds, about 438 seconds and about 599 seconds.

The rate of load decrease of welding system 100, may be between about 1300 and 1600 pounds/second (about 589.7 and 725.7 kilograms/second). For instance, the rate of load decrease (e.g. load slope down) may be about 1325 pounds/second (about 601 kilograms/second). The rate of load decrease may be about 1525 pounds/second (about 691.7 kilograms/second). A shift point, (e.g. the time to apply a load) may be ay any desired interval; however, in various embodiments the shift point is between about 60 and 120 seconds. The shift point may occur at about 80 seconds. Total flow rate and/or ratio of oxygen to propylene gas may carry more weight than the timing of the shift point and/or the rate of load decrease. Stated another way, total flow rate and/or ratio of oxygen to propylene gas may be factors that influence the quality of the bond as compared with the rate of load decrease and/or shift point. The distance to apply the load may be about 0.9 inches (about 2.286 centimeters).

Figure 2:
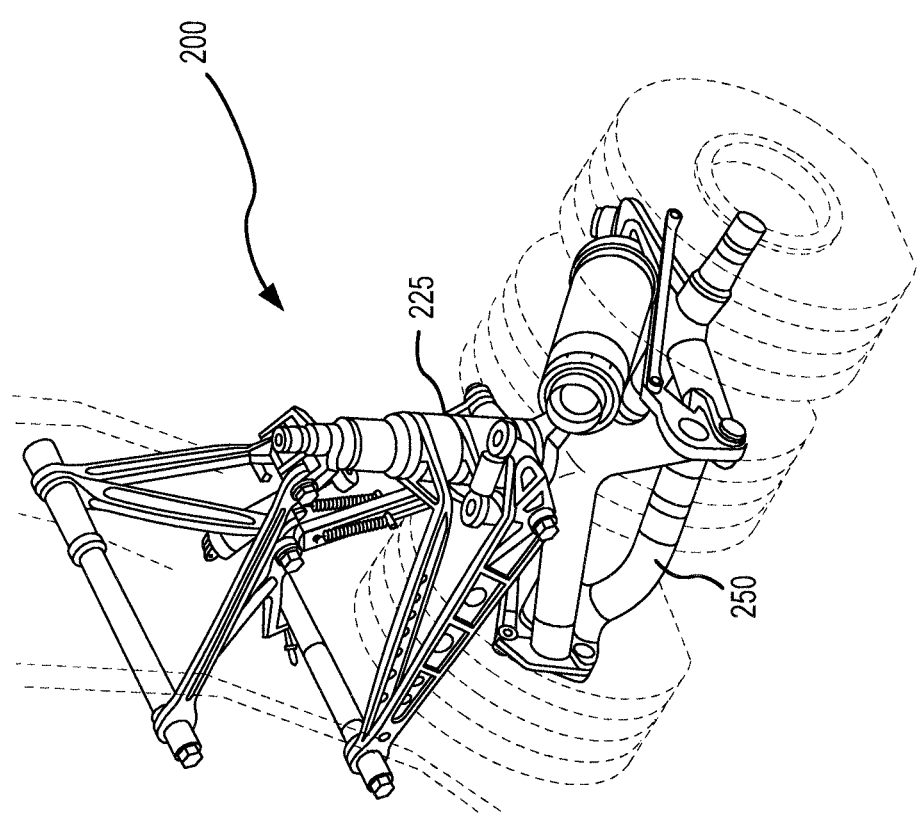
FIG. 2 illustrates various structures fabricated using a pressure welding system in accordance with various embodiments.

Welding system 100 may be used to weld two parts together. The parts may be any suitable parts. For instance, the parts welded by welding system 100 via an oxygen-and-propylene gas mixture may be a structural part of a vehicle, an aspect of a tool and/or the like. According to various embodiments, welding system 100 may be used to produce aircraft parts. For instance, the aircraft may be a commercial aircraft and/or a military aircraft such as a military transport aircraft. Specifically with reference to FIG. 2, the landing gear 200 and its elements are shown. A middle landing gear component of a military transport aircraft may be fabricated in part utilizing welding system 100. For instance, two parts may be welded together to form post 225. Landing gear post 225 may be made from any suitable material. According to various embodiments, landing gear post 225 is made of steel. A completed landing gear post 225 is generally tubular in shape. Landing gear post 225 may be coupled to an upper cross shaft and a lower cross shaft of landing gear 200. Landing gear post 225 may be coupled to axle beam 250.

According to various embodiments, the axle beam 250 may be fabricated in part utilizing welding system 100. For instance, parts may be welded together to form axle beam 250 using welding system 100. Axle beam 250 may be made from any suitable material. According to various embodiments, axle beam 250 is made of steel. A completed axle beam 250 (e.g. welded from two parts) is generally tubular in shape with a slight bend from its distal to proximal end. The bend is generally less than 90 degrees. Axle beam 250 may couple to the axel of landing gear 200 which retains the wheel.

According to various embodiments, a weld may be made by welding system 100 comprising a total gas flow of about 705 cubic feet (about 19,963 liters) per hour. The oxygen to propylene ratio may be about 2.43. The gas flow of the oxygen and propylene mixture may be applied substantially continuously. The dynamic pressure of the propylene gas of the oxygen and propylene mixture may be between 29 and 31 pound-force per square inch (PSIG) (about 199,947.96 pascals and 213,737.47 pascals). The flow of the propylene gas from the gas supply 110 may be about 206 cubic feet per hour.

For instance, a flow rate of the propylene gas may be between about 195 and 215 CFH. A flow rate of the oxygen gas may be between about 485 and 510 CFH. The dynamic pressure of the oxygen gas of the oxygen and propylene mixture may be between 29 and 31 (PSIG) (199,947.96 pascals and 213,737.47 pascals). The flow of the propylene gas from the gas supply 120 may be about 499 cubic feet (about 14,130 liters) per hour.

Figure 3:
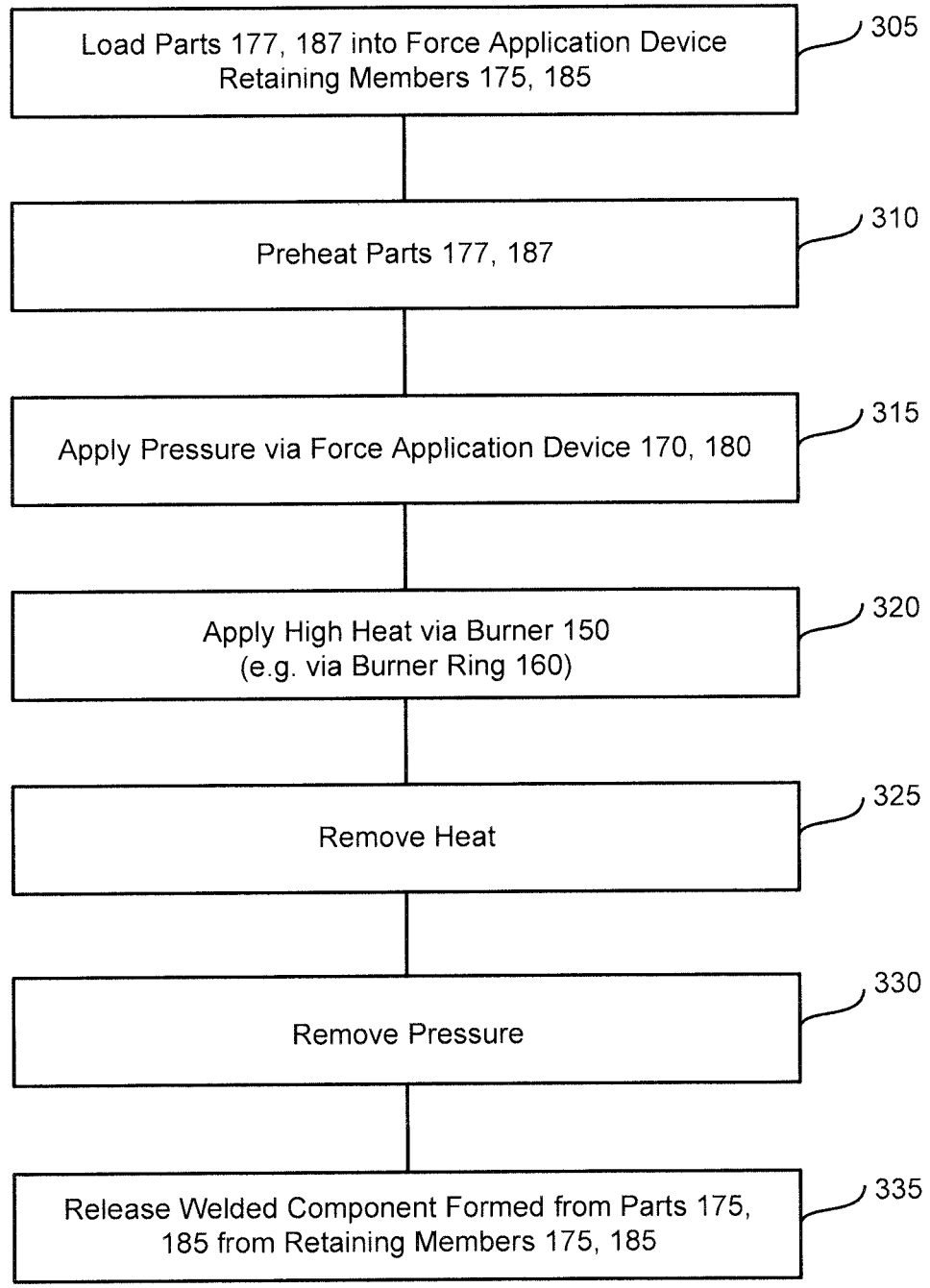
FIG. 3 illustrates a flow diagram in of a pressure welding system in accordance with various embodiments.

According to various embodiments and with reference to FIG. 3, process for welding two parts, such as two parts of post 225 and/or axle beam 250, may comprise loading at least two parts 177 and 187 into first force application device 170 and second force application device 180 (step 305). The process may include preheating one or more parts 177, 187, such as of post 225 and/or axle beam 250 (step 310). The preheating may be at a temperature of about 1150 degrees Fahrenheit (about 621.1 degree Celsius) for about 2 hours. Parts 177, 187 may be retained by retaining member 175 and retaining member 185. Parts 177, 187 are introduced to high heat (i.e., welding temperature), via burner 150 fueled by gas-and-oxygen fuel source (step 320). The gas-and-oxygen mixture may be an oxygen-and-propylene mixture. Parts 177, 187 may be forced together by first force application device 170 and/or second force application device 180 at any time, such as prior to preheating, intermittently, substantially constantly, during pre-heating, prior to introduction to welding temperature heat, during welding temperature heat, and/or after welding temperature heat is reduced and/or removed (step 315). The high heat may be ceased (step 325). The application of pressure may end at any suitable time (step 330).

According to various embodiments, the process may include austenizing and/or quenching parts 177, 187. An incomplete initial austenitization can leave dissolved carbides in the matrix. For instance, the parts 177, 187 may be subject to about 1600 degrees Fahrenheit for about 1.5 hours. Parts 177, 187 may be quenched to obtain certain material properties. Quenching prevents low-temperature processes, such as phase transformations, from occurring. Quenching may comprise a process that rapidly reduces the temperature of a part. For example, quenching may comprise the application of a cooling liquid (e.g., water and/or oil) to a heated part. The formed component, formed from welded parts 177, 187 may be removed from retaining members 175, 185 at any suitable time (step 335).

According to various embodiments and with reference to FIGS. 4A-4B, a burner ring 160 of burner 150 may be used to direct high heat and to weld parts 177, 187. Burner ring 160 may be made from any suitable material. For instance, burner ring 160 may be a brass burner ring 160. Burner ring 160 may comprise a generally annular shape. Burner ring 160 may comprise a plurality of outlets 410 for oxygen gas and a secondary gas, such as propylene and/or the oxygen-and-propylene mixture to flow through. Outlets 410 may be located proximate the center of burner ring 160. Beveled edges, see angle 420, may flank the outlets 410 so that contaminants from the welding process, such as any drippings, are directed away from the outlets 410. This may help prevent backfires.

Burner ring 160 may be formed from two half rings. These half rings may be secured together via clamping fixtures 466. Burner ring 160 may be mounted via mounting clips 450. Burner ring 160 may comprise at least one inlet 440 for receiving the oxygen-and-propylene mixture. FIG. 4B depicts an inside portion of burner ring 160 depicted in FIG. 4A along cut-plane "B". Burner ring 160 may further comprise a baffle 430.

In various embodiments, while the pressure welding using propylene as a fuel source system described herein have been described in the context of aircraft applications and the manufacture of aircraft parts, one will appreciate in light of the present disclosure, that its use may be applicable to other machinery and/or vehicles such as, trains.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A process comprising:
 mixing propylene gas and oxygen gas to form a propylene-and-oxygen gas mixture, wherein the oxygen gas is supplied from an oxygen supply tank to a burner unit, and wherein the propylene gas is supplied from a gas supply tank to the burner unit; and
 igniting, by the burner unit, the propylene-and-oxygen mixture as a fuel source for a gas pressure welding apparatus to weld two parts together, wherein a flow ratio of oxygen gas to propylene gas in the propylene-and-oxygen gas mixture is between about 2 and about 3.

2. The process of claim 1, wherein the two parts form a component of a landing gear apparatus of an aircraft.

3. The process of claim 2, wherein the component is at least one of a post and an axle beam.

4. The process of claim 1, further comprising applying force to the two parts by a first force application device and a second force application device.

5. The process of claim 1, wherein the burner unit comprises an annular burner ring comprising a beveled portion configured to enable contaminants of the welding process to flow away from a propylene-and-oxygen gas mixture outlet of the burner unit.

6. The process of claim 1, wherein the flow ratio of oxygen gas to propylene gas in the propylene-and-oxygen gas mixture is about 2.46.

7. The process of claim 1, wherein the flow ratio of oxygen gas to propylene gas in the propylene-and-oxygen gas mixture is between about 2.4 and about 2.5.

8. The process of claim 1, wherein the flow ratio of oxygen gas to propylene gas in the propylene-and-oxygen gas mixture is between about 2.43 and about 2.46.

9. The process of claim 1, wherein a flow rate of the propylene gas is between about 195 and about 215 CFH.

10. The process of claim 1, wherein a flow rate of the oxygen gas is between about 485 and about 510 CFH.

11. The process of claim 1, where the two parts are at least one of a post and an axle beam.

12. The process of claim 1, wherein a pressure dynamic of the supplied oxygen gas is between about 29 and about 31 PSIG and a pressure dynamic of the supplied propylene gas is between about 29 and about 31 PSIG.

13. A method of welding a component comprising:
 loading a first portion of the component in a first force application device,
 loading a second portion of the component in a second force application device;
 preheating the first portion and the second portion;
 applying heat to the first portion and the second portion by a burner unit, wherein the burner unit is fueled by a propylene-and-oxygen gas mixture, wherein a flow ratio of oxygen gas to propylene gas in the propylene-and-oxygen gas mixture is between about 2.4 and about 2.5;
 applying pressure to the first portion and the second portion by compressing the first force application device and the second force application device together; and
 welding the first portion and the second portion into the component.

14. The method of claim 13, wherein the component is a part of a landing gear apparatus of an aircraft.

15. The method of claim 14, wherein the component is at least one of a post and an axle beam.

16. The method of claim 13, wherein the flow ratio of oxygen gas to propylene gas in the propylene-and-oxygen gas mixture is about 2.46.

17. The method of claim 13, wherein the flow ratio of oxygen gas to propylene gas in the propylene-and-oxygen gas mixture is between about 2.43 and about 2.46.

18. The method of claim 13, wherein a flow rate of the propylene gas in the propylene-and-oxygen gas mixture is between about 195 and about 215 CFH.

19. The method of claim 13, wherein a flow rate of the oxygen gas in the propylene-and-oxygen gas mixture is between about 485 and about 510 CFH.

20. A process comprising:
 mixing propylene gas and oxygen gas to form a propylene-and-oxygen gas mixture, wherein the oxygen gas is supplied from an oxygen supply tank to a burner unit, and wherein the propylene gas is supplied from a gas supply tank to the burner unit; and
 igniting, by the burner unit, the propylene-and-oxygen mixture as a fuel source for a gas pressure welding apparatus to weld two parts together, wherein a flow ratio of oxygen gas to propylene gas in the propylene-and-oxygen gas mixture is between about 2 and about 3 and a total flow rate of the propylene-and-oxygen gas mixture is between about 650 and about 850 standard cubic feet per hour (SCFH).

* * * * *

UNITED STATES PATENT AND TRADEMARK OFFICE
CERTIFICATE OF CORRECTION

PATENT NO. : 9,156,102 B2  Page 1 of 1
APPLICATION NO. : 13/956097
DATED : October 13, 2015
INVENTOR(S) : Mark Overmann, Jr. et al.

It is certified that error appears in the above-identified patent and that said Letters Patent is hereby corrected as shown below:

On the title page item [72], after "Mark Overmann, Jr., Lorain, OH (US)", insert
--Scott C. Maitland, Broadview Heights, OH (US)--

Signed and Sealed this
Seventh Day of June, 2016

Michelle K. Lee
*Director of the United States Patent and Trademark Office*